Sept. 27, 1932.   E. A. PITTS   1,879,473
SHELTER FOR DOMESTIC ANIMALS
Filed June 5, 1931
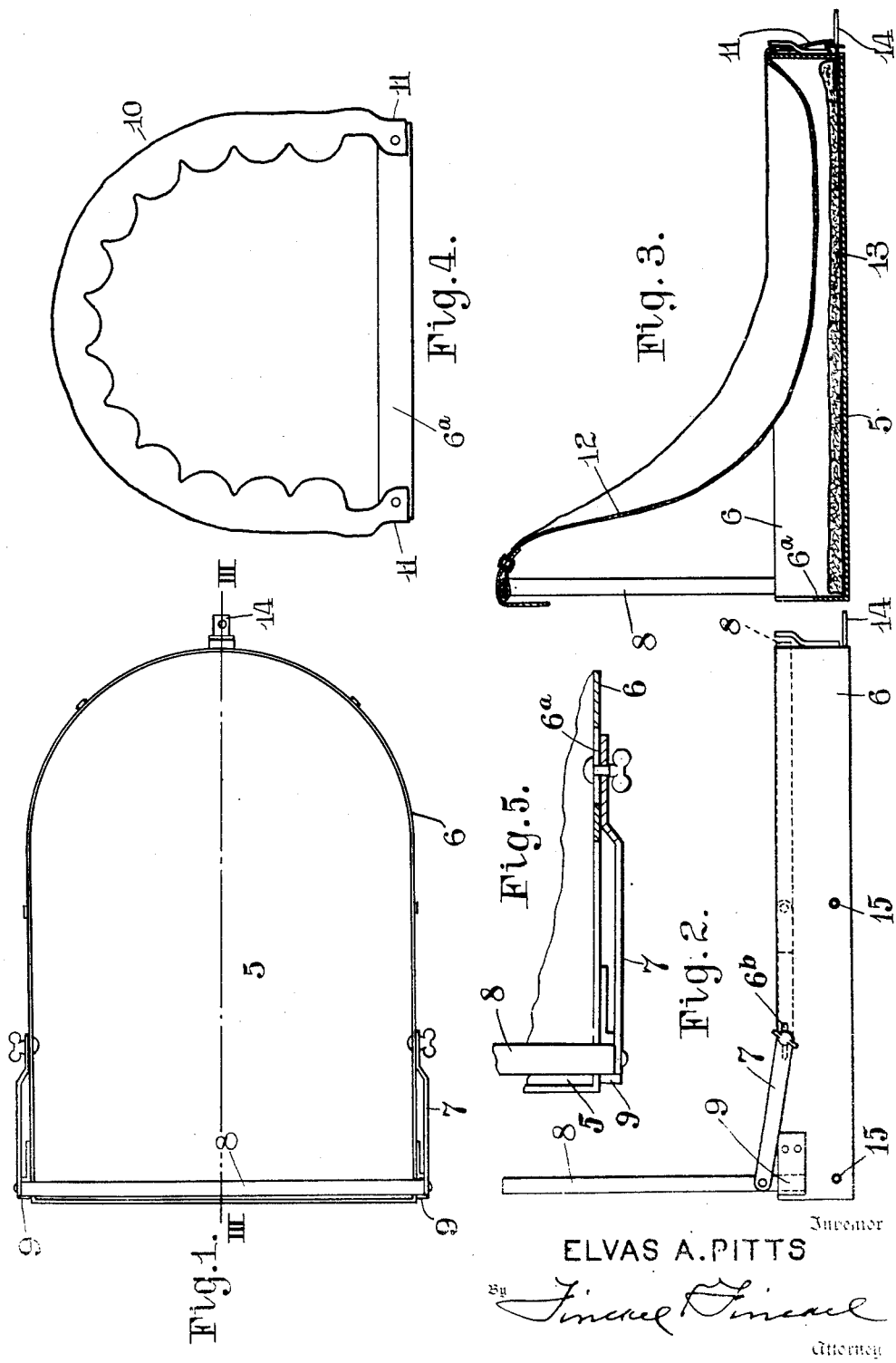
ELVAS A. PITTS Patented Sept. 27, 1932

1,879,473

UNITED STATES PATENT OFFICE

ELVAS A. PITTS, OF COLUMBUS, OHIO

SHELTER FOR DOMESTIC ANIMALS

Application filed June 5, 1931. Serial No. 542,332.

This invention relates to a shelter for a domestic animal and particularly for a dog or a cat.

It is a habit of the domesticated dog to turn around in a circle several times in the spot where he expects to sleep. He will do this on a bare hard floor. Without doubt this habit is an heritage from his wild ancestors who lived and roamed on grassy plains—the turning around in the high grass of such plain, pressing it down, shaping it and making a more comfortable bed.

It is deemed important that domesticated and pampered dogs, whose fibre is not so tough as that of his wild ancestors should be covered and kept covered on cold nights.

The primary object of the present invention is to provide an improved construction of a sheltered bed on which the dog can execute his circles under the cover and when settled on the bed shall be amply and properly covered.

Other objects will appear from the disclosure herein.

The invention is embodied in the example herein shown and described.

In the accompanying drawing—

Figure 1 is a plan view of the frame of the device according to the invention.

Fig. 2 is a side elevation of the same.

Fig. 3 is a vertical section in the line III—III Fig. 1 with the cover applied.

Fig. 4 is a view in elevation of the front or entrance to the shelter.

Fig. 5 is a fragmentary view, on a larger scale, partly in horizontal section, illustrating one of the hinges connecting the door frame with the base.

In the views the base is preferably a pan-shaped structure of sheet metal with a bottom 5 and a surrounding flange 6, the portion 6ª of the flange at the front end being not quite so high as the rest of it. The base is preferably made of metal and of different dimensions and according to the size of the dog for whose use it is designed, the width being somewhat less than the length but of such dimension that the dog can go onto the bed and turn around according to his habit. The base is preferably of metal because of its imperviousness to ground moisture but it can be of wood or a combination of wood and metal.

Hingedly connected by means of links 7 with the opposite longer sides of the flange 6 at the forward portion of the base is a metallic bow-shaped door frame 8. The terminals of the legs of said frame 8 can be inserted into and removed from the sockets 9 provided near the forward corners of the base. The base can be slotted, as at 6ᵇ for the hinging connections of the links to the base to permit swinging of the door frame 8 rearward when the latter is to be folded down on the base as will now appear.

The bow-shaped frame when in erected position forms, as before indicated, a doorway or entrance to the shelter and is shown as made of such dimensions that it can be folded down around the outer side and rear flanges of the base when the cover is removed as indicated in broken lines, Fig. 2.

When the door frame 8 is folded down on the base as described the device occupies smaller space and its storage and transportation is facilitated.

The character 10 designates the top or cover which can be of suitable material such for example as canvas, Canton flannel or other flexible blanketing material adapted to confine heat and exclude cold. The cover is made with a bottom strip 11 that fits snugly around the outer side of the base and a top portion 12 secured to the base, said top portion being full enough to permit the dog to walk or creep thereunder and turn around and thereafter permit the cover to sink onto and more or less around the dog when he has settled to sleeping position.

The base and the cover are provided with ordinary snap buttons or grommet members 15 for removably securing the cover thereto as indicated in the drawing. The cover thus can be detached for washing when necessary.

The rear of the base is provided with a hanger strap 14 as shown.

In practice the base is provided with a removable pad or mattress 13 that can be periodically cleaned.

It will be observed that the flexible top or cover acts as an automatic covering inasmuch as it permits the dog to enter and leave the shelter at any time without disengaging the cover.

Where the length of the base is made a trifle more than the length of the dog in the prone position and the width less, the dog will naturally lie longitudinally on the bed and with his head at the entrance to obtain air and watch for intruders.

In warm weather or in a warm house the device can be used as an open bed, free of obstructions, by removing the door frame from its footing on the base and swinging it over and folding it around the rear rim of the base as shown in broken lines Fig. 2.

The forms of the parts can be changed without departing from the gist of the invention as claimed.

What I claim is:

1. In a shelter for a domestic animal including a base, a door frame removable at its foot from the base, a flexible cover supported by said frame and a link hingedly connecting the door frame with the base, the sum of the height of the door frame and the length of the link being substantially equal to the length of the base from the point of connection of the link with the base.

2. In a shelter for a domestic animal including a base, a door frame removable at its foot from the base, a flexible cover supported by said frame and a link hingedly connecting the door frame with the base, the sum of the height of the door frame and length of the link being substantially equal to the length of the base from the point of connection of the link with the base, one of said hinging connections of said link being slidable.

3. In a shelter for a domestic animal including a base, a bow-shaped door frame removable at its foot from the base, a flexible cover, and a link hingedly connecting the door frame with the base, the sum of the height of the door frame and the length of the link being substantially equal to the length of the base from the point of connection of the link with the base, one of said hinging connections of said link being slidable on the base.

4. A shelter for a domestic animal including a base and an arched frame constituting an entrance way, a link hingedly connecting said frame with the base, and a cover suspended from said frame and extending over said base for attachment thereto, said cover being removable, said frame being collapsible to a position approximately around the rim of said base after partial or total removal of said cover to provide a bed without a cover and also to facilitate packing.

5. A shelter for a domestic animal including a base rounded at one end and having sockets at the opposite end, an arched entrance way supported in said sockets, and a link pivotally connected at its ends to the base and to said entrance way, said entrance way upon removal from said sockets being swingable about said links for collapsing against said base at the rounded end thereof, said links and said entrance way together having a linear length substantially equal to the perimeter of said base as measured from the pivotal points of said links whereby an animal may lie on said bed when said entrance way is in collapsed position.

ELVAS A. PITTS.